United States Patent [19]
Hughes

[11] Patent Number: 6,082,877
[45] Date of Patent: Jul. 4, 2000

[54] INDOOR/OUTDOOR LIGHTING ASSEMBLY

[76] Inventor: Mary Virginia Hughes, 1007-1009 Ursulines, New Orleans, La. 70116

[21] Appl. No.: 09/036,253

[22] Filed: Mar. 6, 1998

[51] Int. Cl.[7] .............................. F21V 1/00; F21V 21/00
[52] U.S. Cl. ..................... 362/360; 362/183; 362/152; 362/413; 362/311; 428/28
[58] Field of Search ................................ 362/183, 152, 362/413, 311, 355, 360; 428/28

[56] References Cited

U.S. PATENT DOCUMENTS

| | | | |
|---|---|---|---|
| D. 179,337 | 12/1956 | Brown | D26/68 |
| D. 194,624 | 2/1963 | Pettengill | D26/67 |
| D. 252,894 | 9/1979 | Hazerjian | D26/67 |
| D. 309,788 | 8/1990 | Koziol | D26/67.71 |
| D. 348,530 | 7/1994 | Harker | D26/68 |
| D. 351,921 | 10/1994 | Harres et al. | D26/68 |
| D. 366,713 | 1/1996 | Cornell et al. | D26/68 |
| 572,354 | 12/1896 | Buckner . | |
| 734,158 | 7/1903 | Bower . | |
| 801,272 | 10/1905 | Schmitt | 362/360 |
| 1,019,246 | 3/1912 | Godinez et al. | 362/414 X |
| 1,042,750 | 10/1912 | Bader | 362/431 X |
| 1,819,733 | 8/1931 | Castelli | 362/431 |
| 2,177,204 | 10/1939 | Buzick et al. . | |
| 2,361,354 | 10/1944 | Regester . | |
| 2,680,317 | 6/1954 | Lewis . | |
| 2,773,171 | 12/1956 | Pennow . | |
| 2,794,116 | 5/1957 | Morein et al. . | |
| 3,015,720 | 1/1962 | Silverman . | |
| 3,440,996 | 4/1969 | Crocella et al. . | |
| 3,476,929 | 11/1969 | Klinger . | |
| 3,551,684 | 12/1970 | Burton | 250/239 |
| 3,805,055 | 4/1974 | Cassey | 240/108 |
| 3,819,924 | 6/1974 | Thomas et al. | 240/2 |
| 3,833,804 | 9/1974 | Vesely | 240/125 |
| 3,866,034 | 2/1975 | Russo | 362/152 |
| 4,275,434 | 6/1981 | Borowitz | 362/311 X |
| 4,434,455 | 2/1984 | Merritt | 362/307 |
| 4,509,105 | 4/1985 | Short, Sr. | 362/414 |
| 4,527,225 | 7/1985 | Hartman | 362/427 X |
| 4,656,569 | 4/1987 | Buskell | 362/418 |
| 4,768,139 | 8/1988 | Poppenheimer | 362/302 |
| 4,817,315 | 4/1989 | Kammerer et al. | 40/554 |
| 4,930,055 | 5/1990 | Swadell | 362/244 |
| 5,062,028 | 10/1991 | Frost et al. | 362/183 |
| 5,105,343 | 4/1992 | Wakimoto | 362/101 |
| 5,121,312 | 6/1992 | Hyland et al. | 362/352 X |
| 5,193,902 | 3/1993 | Hyland et al. | 362/352 |
| 5,226,721 | 7/1993 | Stokes | 362/153 |
| 5,274,537 | 12/1993 | Altman | 362/353 |
| 5,331,527 | 7/1994 | Stokes | 362/153.1 |
| 5,384,694 | 1/1995 | Yang | 362/298 |
| 5,392,204 | 2/1995 | Schumaker | 362/294 X |
| 5,398,180 | 3/1995 | Lee | 362/431 |
| 5,406,466 | 4/1995 | Stokes | 362/153.1 |
| 5,420,773 | 5/1995 | Huang | 362/410 |
| 5,491,616 | 2/1996 | Reed | 362/35 |
| 5,504,397 | 4/1996 | Chien | 315/185 |
| 5,526,243 | 6/1996 | Masters | 362/122 |
| 5,567,045 | 10/1996 | Bucek | 362/363 |

*Primary Examiner*—Laura K. Tso
*Attorney, Agent, or Firm*—Garvey, Smith, Nehrbass & Doody, LLC

[57] ABSTRACT

A first embodiment is an indoor lighting assembly which includes a base member supporting an upright tube long extension engaged into the base member with the extension terminating in an extension in a tube top assembly. The tube top assembly would further comprise a plurality of switches, and would support an upright, fluorescent tube light. There would further be provided a vented pedestal member supported by the tube top, and resting thereupon. The vented pedestal further defining a cone shaped support member with the top of the cone terminating for supporting a finial base and a finial cup thereupon. The tube long extension and tube top members further include a plurality of rechargeable batteries therein. The rechargeable batteries serving as a source of power to the fluorescent tube light, and operable via the switches positioned on the tube top. There may be further included a solar cell engaged around the outer cone portion of the vented pedestal, for providing solar power as an alternative light source. It is further provided that there be included a plurality of interchangeable graphic panels which are positioned on the exterior surface of the cone portion of the vented pedestal, and a series of interchangeable finial cups which are positioned on the finial base for providing the decorative portions of the lamp assembly.

20 Claims, 11 Drawing Sheets

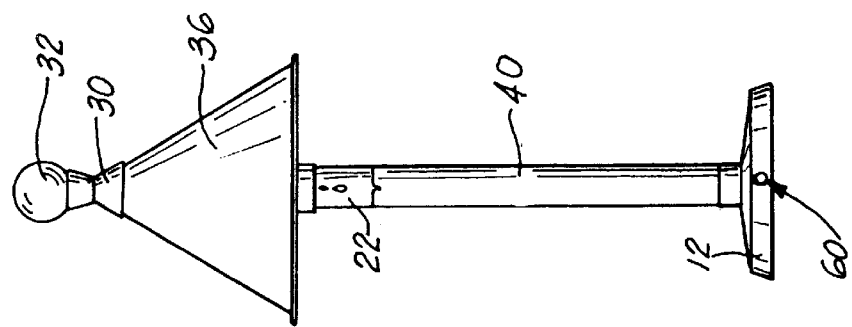
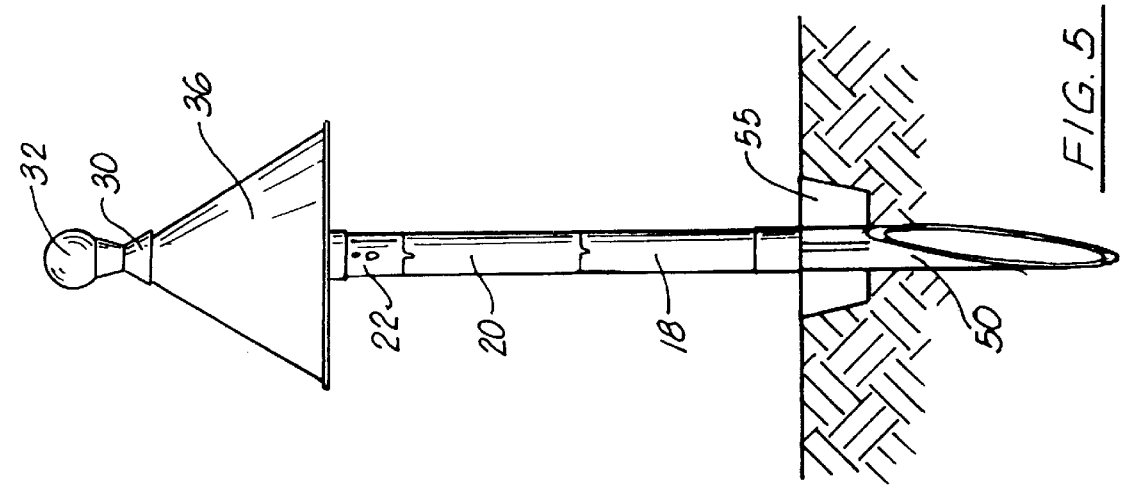
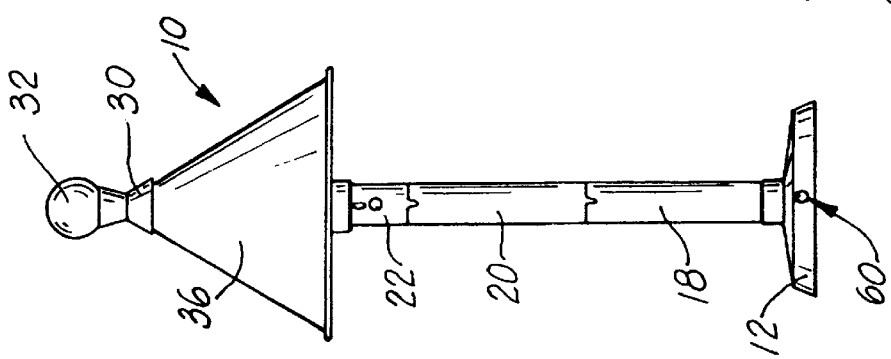

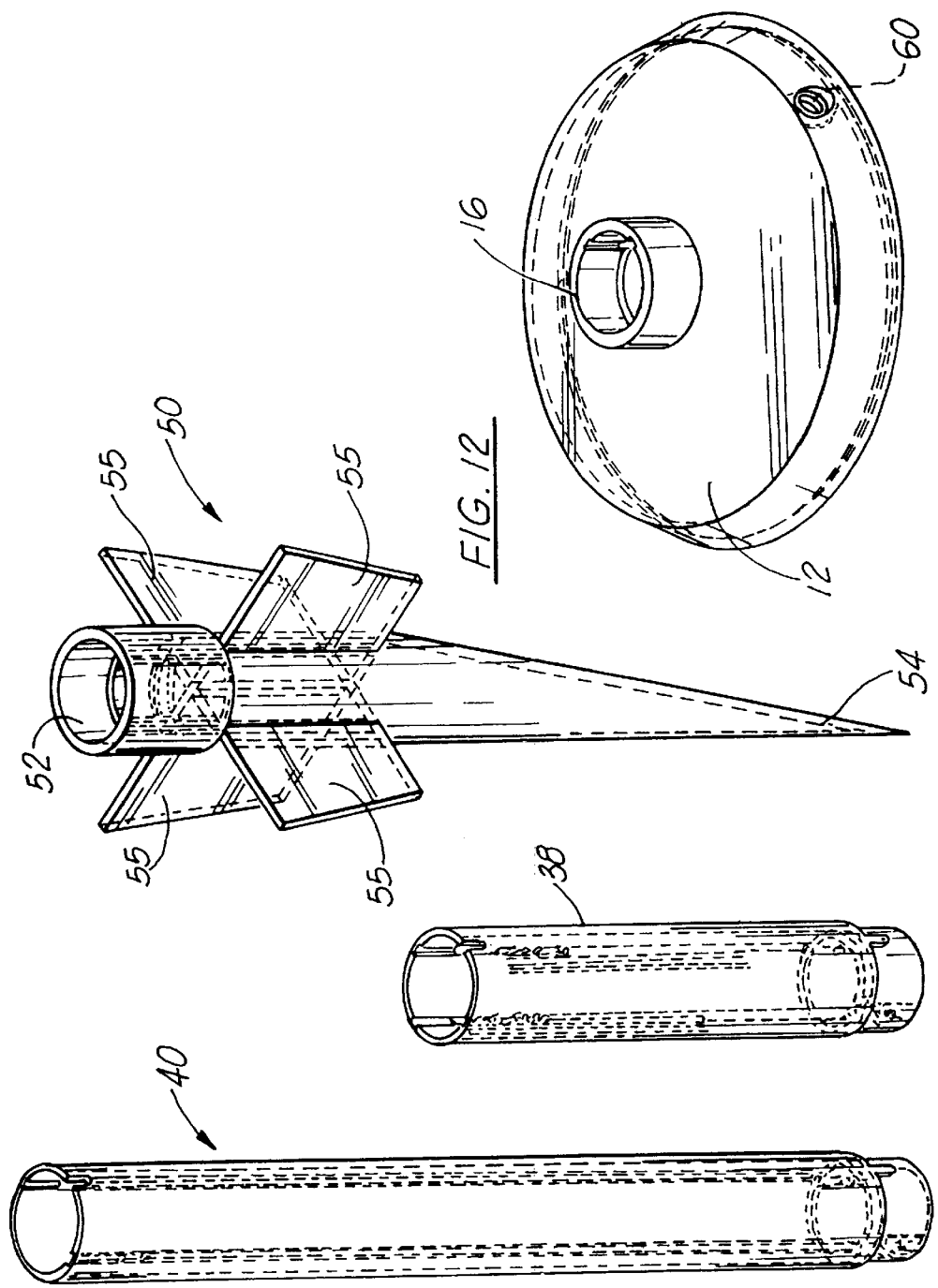

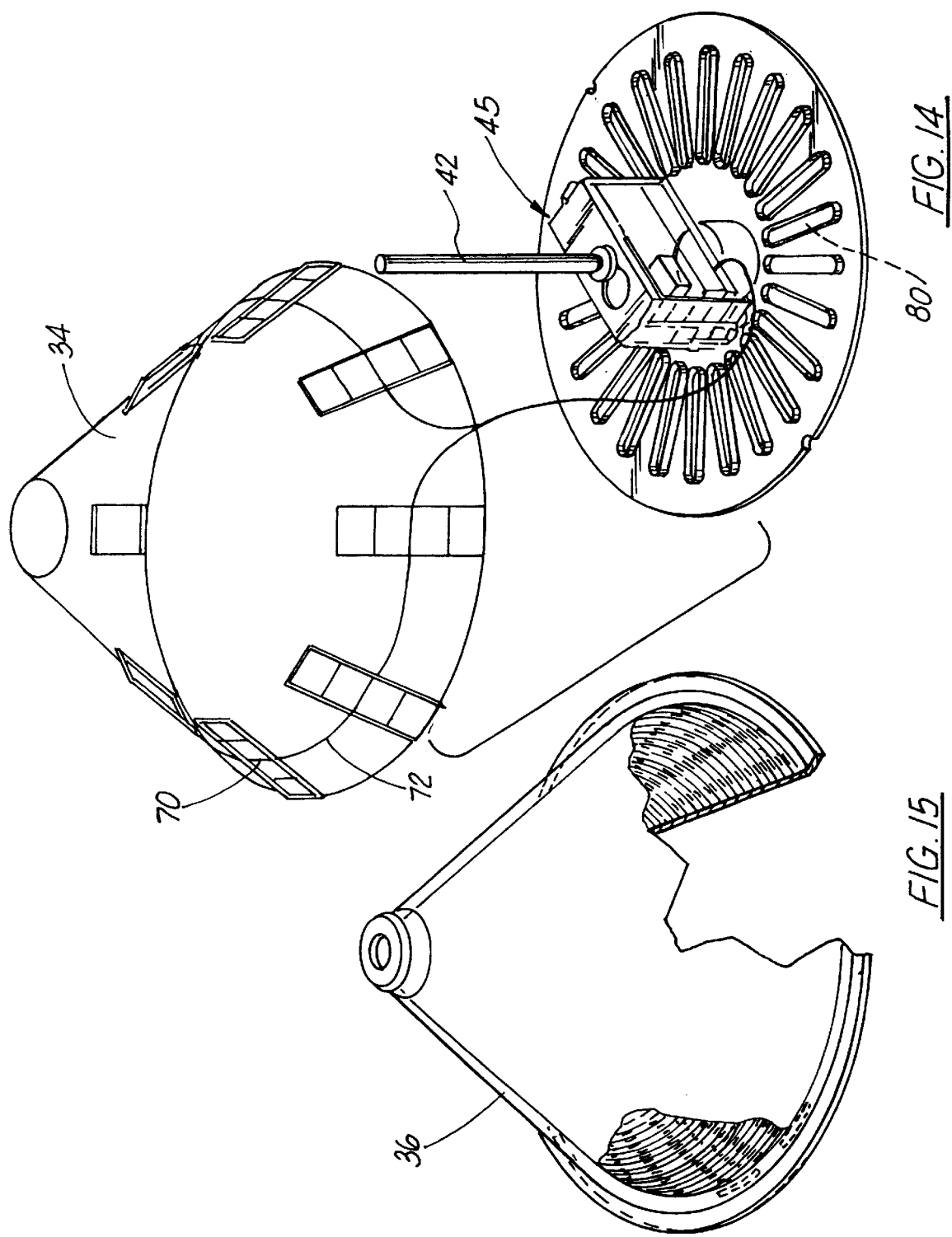

INDOOR/OUTDOOR LIGHTING ASSEMBLY

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to lighting systems. More particularly, the present invention relates to an indoor/outdoor lighting system which includes multiple optional sources of energy, and has the ability to be configured into an outdoor assembly or an indoor lamp or lighting assembly, with interchangeable, multiple, decorative features.

2. General Background of the Invention

In the field of lighting systems, in the current state of the art, most lighting systems are either indoor lighting systems or outdoor lighting systems such as indoor lamps or other types of lighting assemblies, and outdoor assemblies which are of the type which are placed strategically either mounted exteriorly or placed within the ground as a ground lighting system. Typically, these assemblies are of the type that would not have the ability to be interchangeable between indoor and outdoor systems, and therefor one would have to purchase multiple lighting systems for both indoor and outdoor use.

For example, it appears to be not known in the art that a table lamp of typical type having a base with an extendable upright support member supporting a light bulb and a lamp shade would not be the type of fixture that would necessarily be used or could be interchanged as an outdoor lighting assembly. Likewise, the type of lighting assemblies that are placed in the ground as a base lighting system are not typically interchangeable so that they can be used as an indoor lighting system such as a lamp on a table. Therefore, there appears to be a need in the art with a multiple lighting assembly of the type as will be described in the present invention, which enables one to use them both as an indoor and outdoor lighting system, and to enable the system to have interchangeable, decorative features.

BRIEF SUMMARY OF THE INVENTION

The lighting system of the present invention solves the shortcomings in the art in a simple and straightforward manner. What is provided in a first embodiment is an indoor lighting assembly which includes a base member supporting an upright tube long extension engaged into the base member with the extension terminating in an extension in a tube top assembly. The tube top assembly would further comprise a plurality of switches, and would support an upright, fluorescent tube light, or other suitable light fixture. There would further be provided a vented pedestal member supported by the tube top, and resting thereupon. The vented pedestal further defining a cone shaped support member with the top of the cone terminating for supporting a finial base and a finial cup thereupon. The tube long extension and tube top members further include a plurality of rechargeable batteries therein. The rechargeable batteries serving as a source of power to the fluorescent tube light, and operable via the switches positioned on the tube top. There may be further included a solar cell, comprising a series of panels engaged around the outer cone portion of the vented pedestal, for providing solar power as an alternative light source. It is further provided that there be included a plurality of interchangeable graphic panels which are positioned on the exterior surface of the cone portion of the vented pedestal member, and a series of interchangeable finial cups which are positioned on the finial base for providing the decorative portions of the lamp assembly.

In a second embodiment, the assembly may be positioned as an exterior lighting assembly by interchanging the circular base member of the lamp assembly with a tube ground stake which includes a stake stabilizer and an elongated tube with a pointed end that could be pushed into the ground for supporting the upper lamp assembly of the type that was described in the first embodiment. As with the first embodiment, this assembly would likewise be powered either by rechargeable batteries or by alternative sources such as solar power and batteries recharged by solar power. The alternative would be hard wiring the outdoor/indoor light system.

Therefore, it is a principal object of the present invention to provide a decorative lighting system which is able to be interchanged between indoor and outdoor uses;

It is a further object of the present invention to provide a multiple use lighting assembly for indoor and outdoor uses, which includes decorative features that are interchangeable, depending on the type of decorations required;

It is a further object of the present invention to provide a multiple use lighting system for both indoor and outdoor use, which includes a multiple source of power such as rechargeable batteries or solar energy or hard wiring;

It is a further object of the present invention to provide a multiple lighting system for indoor and outdoor use, which may have multiple features such as multiple power sources, multiple decorative, interchangeable decorative features; and the ability to be extended to various heights, depending on the type of assembly required.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 4 illustrates a side view of the indoor embodiment of the lighting assembly of the present invention utilizing a plurality of extender members;

FIG. 5 illustrates a side view of the outdoor embodiment of the lighting assembly of the present invention secured in the ground;

FIG. 6 illustrates a side view of the indoor embodiment of the lighting assembly of the present invention utilizing a single extender member;

FIGS. 10 and 11 illustrate alternate tube long extensions of the lighting assembly of the present invention;

FIG. 12 illustrates an overall view of the tube ground stake used in the outdoor embodiment of the present invention;

FIG. 13 illustrates the base portion of the indoor embodiment of the lighting assembly of the present invention;

FIG. 14 illustrates a partial exploded view of the interior cone of the present invention that would be used with the solar power portion of the present invention;

FIG. 15 illustrates a typical decorative cone positionable on the cone portion of the vented pedestal in the present invention.

DETAILED DESCRIPTION OF THE INVENTION

Figure 1:
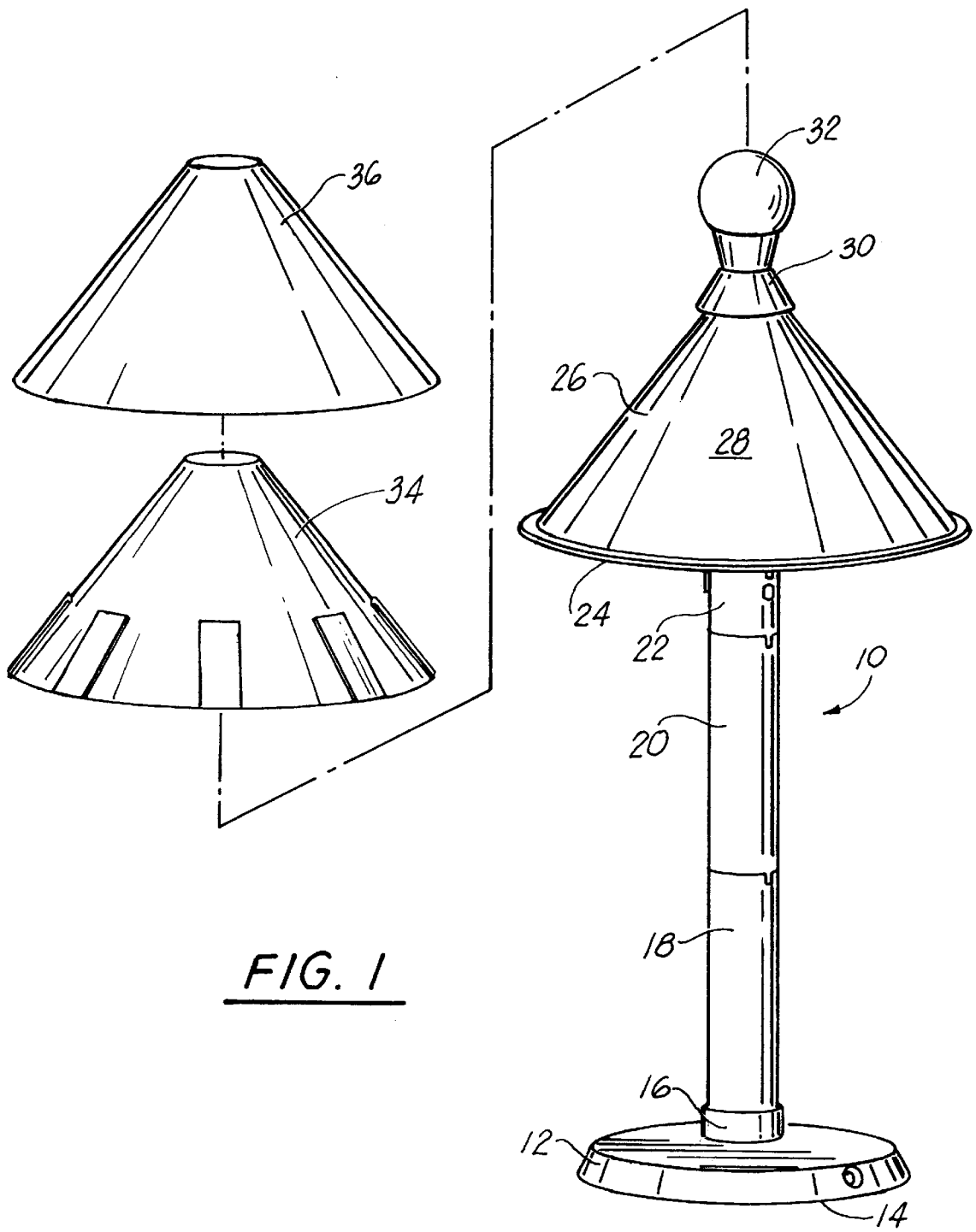
FIGS. 1 and 1A illustrate overall exploded and cross-section views respectively of the indoor embodiment of the lighting assembly of the present invention.
Figure 1A:
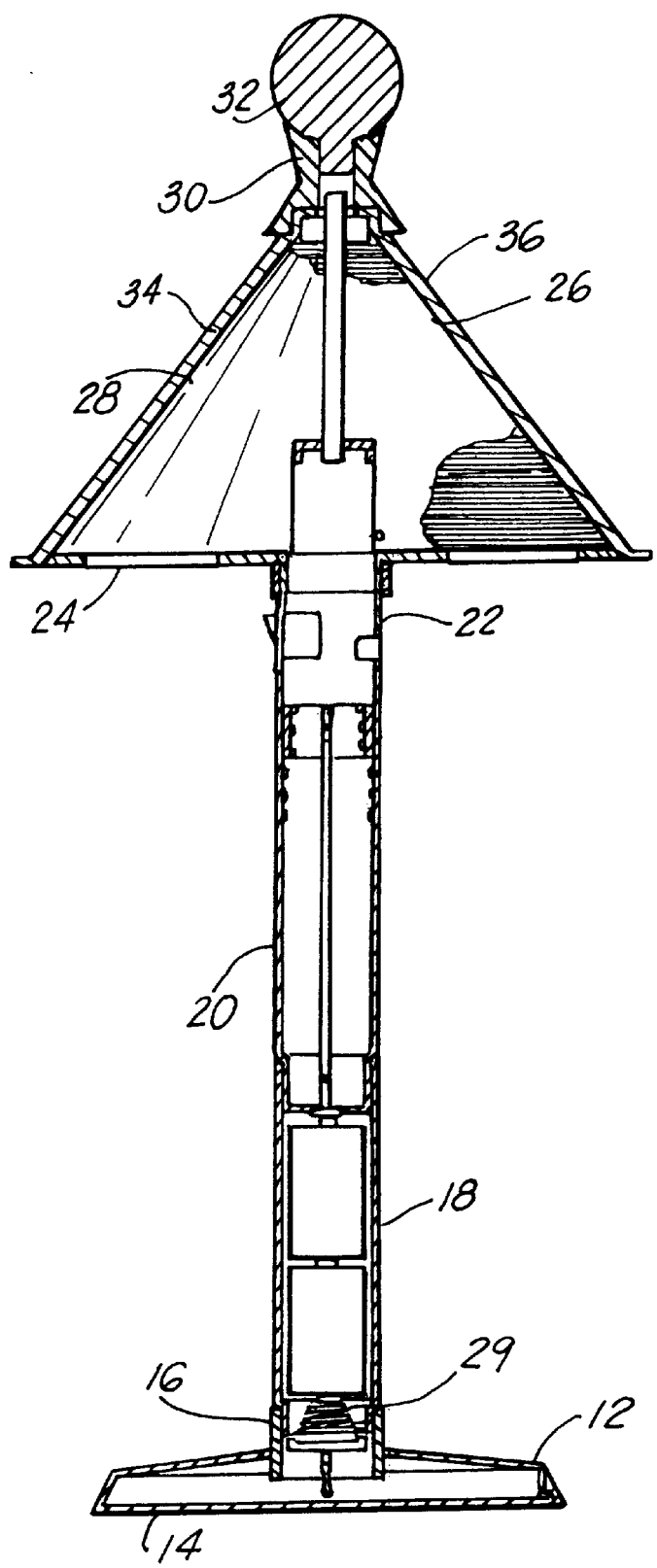

FIGS. 1–16 illustrate the preferred embodiments of the indoor and outdoor lighting assembly of the present invention. Reference is made to FIGS. 1 and 1A where there is illustrated overall side and cross-section views respectively of the indoor embodiment of the lighting assembly designated by the numeral 10. As illustrated, lighting assembly 10 includes the basic components of a circular base member 12, having a lower surface 14 for resting on a table top or the like, and having an upper circular support ring 16, for engaging a first lower tube long extension member 18. In this particular embodiment, there is then illustrated a second tube long extension member 20, secured on its lower end to the lower tube extension member 18 and supporting on its upper end a top tube member 22. The top tube member 22 as seen in FIG. 1 would be supporting a circular vented pedestal member 24, which will be described more fully, which supports thereupon an interior cone member 26 having a conical shaped wall portion 28, terminating in an upper portion for supporting a finial base 30 and a finial cup 32 thereupon. The finial member would generally comprise the finial cup 32 supported on a finial collar 30, as a two-part arrangement. As further illustrated in FIG. 1, the interior cone member 26 would support an intermediate power cone 34 as will be described further, and an exterior graphic panel cone 36, which would be an important decorative feature of the lamp as would be the finial base 30 and finial cup 32 to be described further.

Figure 2:
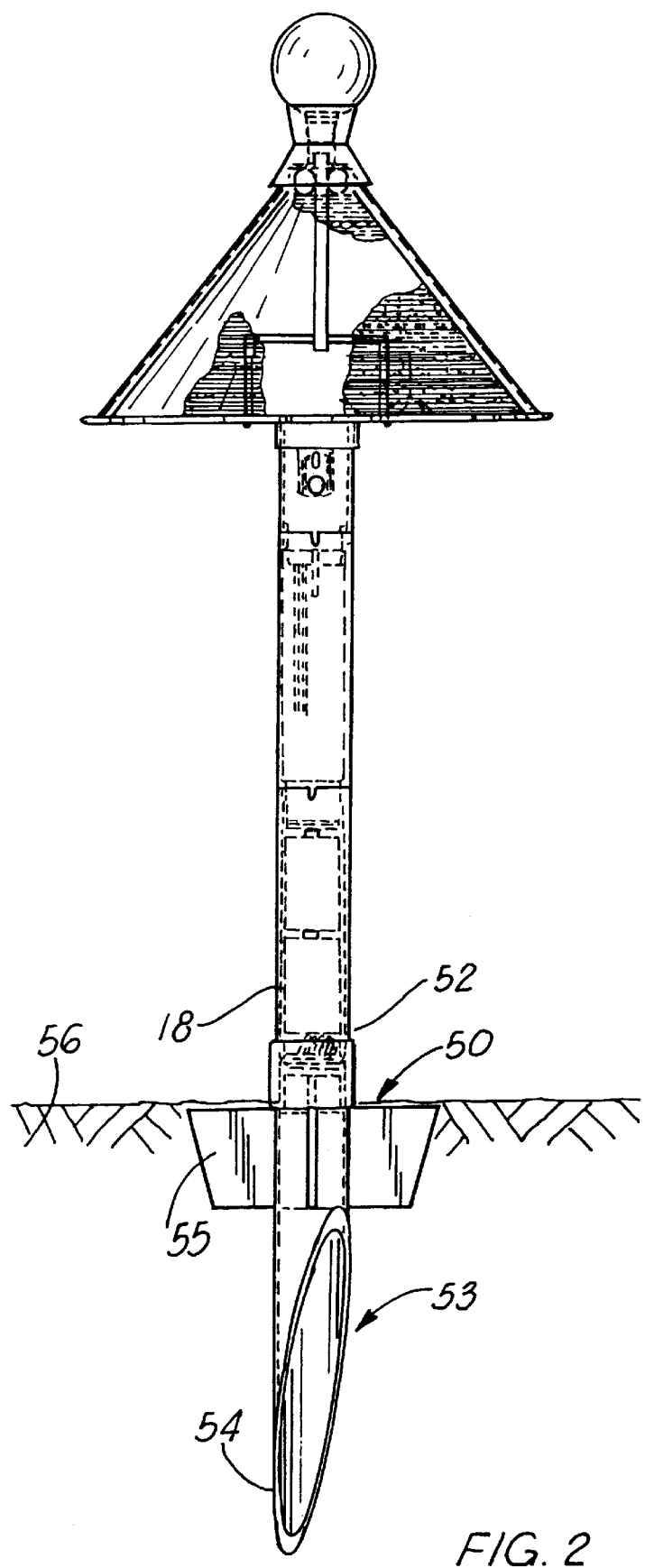
FIG. 2 illustrates an overall cross-section view of the outdoor embodiment of the lighting assembly of the present invention.

FIG. 2 illustrates, in cross-section view, the second outdoor embodiment of the present invention. As seen, the embodiment 10A as seen in FIG. 2 is similar in most respects to the embodiment 10 as illustrated in FIGS. 1 and 1A. However, as seen in FIG. 2, there is illustrated the tube ground stake member 50 which would be utilized in place of the circle base member 12 when the lighting assembly is used as an exterior lighting assembly. Simply put, the lower end of the lower tube extension member 18 would engage into the upper opening 52 of the tube ground stake 50, and the lower spear end 54 of the tube ground stake 50 would be forced into the ground 56, so that the lighting assembly as illustrated in particular in FIG. 4 would be maintained upright as an exterior lighting assembly 10. As further illustrated, there would be provided a plurality of spaced apart wings 55 extending outward from stake 50 below the opening 52, which would likewise be driven into the ground, offering further support to the lighting assembly 10A in a 360 degree direction. Further, as illustrated in FIG. 3, there is an alternative means for operation of the lighting system whether it be an indoor system or an outdoor system, and this means includes a remote control 59, which would activate a remote control switch of the type known in the art in the lamp, for activating the lamp rather than having a manual on/off switch to activate the lamp in all occasions.

Figure 3:
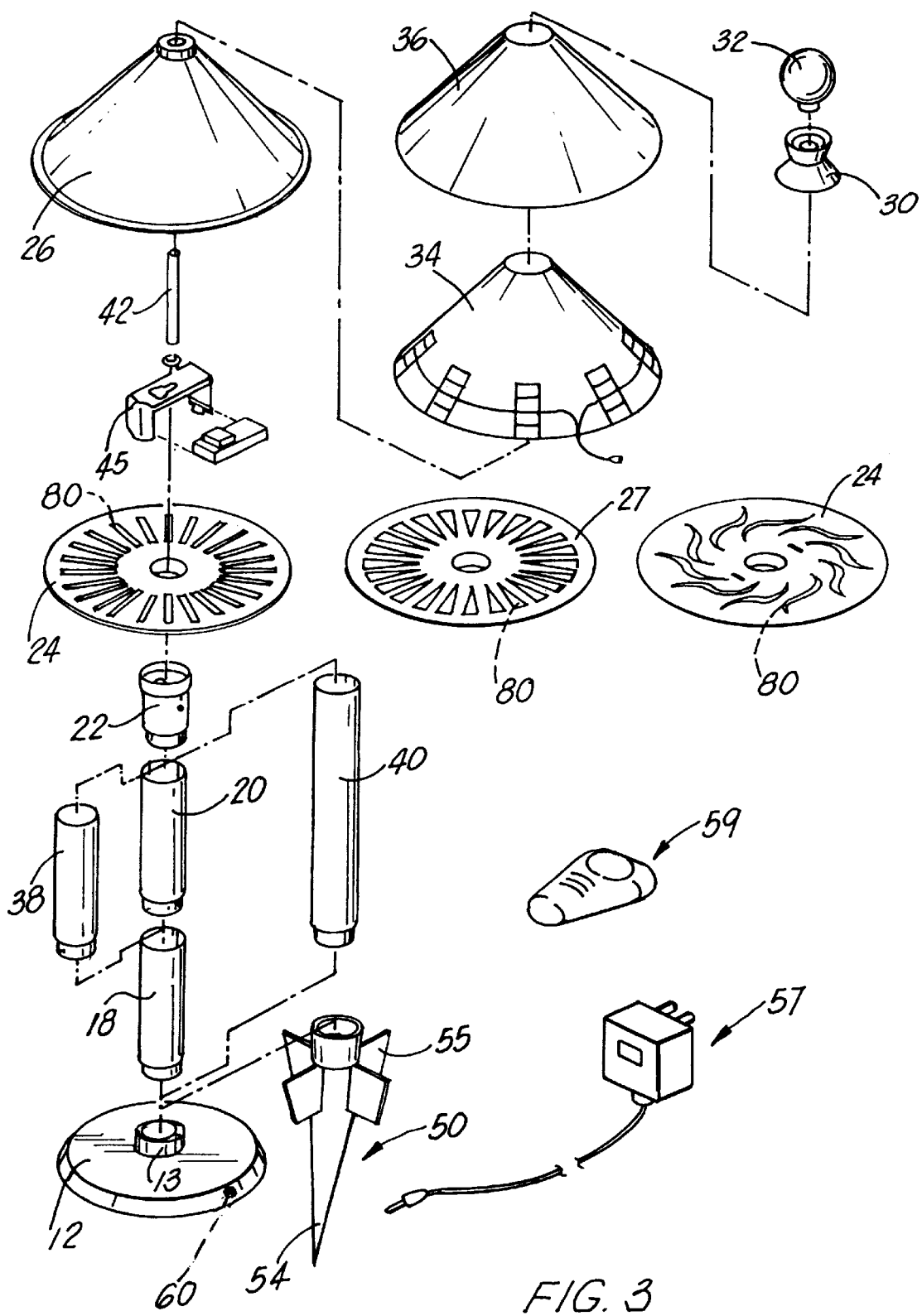
FIG. 3 illustrates an exploded view of the indoor and outdoor embodiments of the present invention.

Turning now to FIG. 3, there is seen in overall exploded view the various major components of both the indoor and outdoor features of the lighting system of the present invention. Again, as illustrated in FIGS. 1 and 2, there is illustrated the circular base portion 12 wherein there is supported thereupon a lower tube long extension member 18 which may support a second upper tube long extension 20 thereupon. As further illustrated, there is illustrated a third tube long extension member 38 which may be utilized to extend the height of the lighting assembly 10 even further. As an alternate, there may be provided a single tube long extension member 40 which would be utilized in place of the upper and lower members 18 and 20, as illustrated in FIG. 3. In any event, in spite of which of the extension members would be utilized, at the upper end of the upper member 20, there would be supported the tube top portion 22. The tube top portion 22 would be configured for supporting a circular vented pedestal member 24. As illustrated in FIG. 3, this pedestal member 24 is illustrated as having three different series of vents 25 in its face so as to provide a different decorative lighting pattern. Further, as illustrated, the pedestal member 24 would engage an upper support bracket 40, which would support a high efficiency, fluorescent tube light 42. The upper portion of the assembly would include again as was described in FIG. 1, a first interior cone member 26, a second intermediate cone member 34 for providing the lighting of the cone member 34 and a third exterior cone member 36 set thereupon which would be a graphic panel cone so that when the phosphorescent tube light 42 was energized, the graphic panel cone 36 would provide the decorative lighting feature. Upon full assembly, there would then be placed a finial base 30 and a finial cup 32 on the top of the graphic panel 36 for providing the full lighting assembly 10. There is further illustrated the stake 50 which would be utilized with the outdoor embodiment 10A, and an electrical transformer and line 57, for plugging into port 60 when the lighting assembly 10, 10A is utilizing AC power.

FIGS. 4 and 6 illustrate the overall features of the interior lighting assembly 10 with FIG. 3 showing multiple tube long extension members 18 and 20 and FIG. 6 illustrating a single tube long extension 40 in the preferred embodiment of the interior lighting assemblies. FIG. 5 illustrates assembly 10A with stake 50 in place of base 12, and, together with wings 55, driven into the ground 56 as an outdoor fixture.

Figure 9:
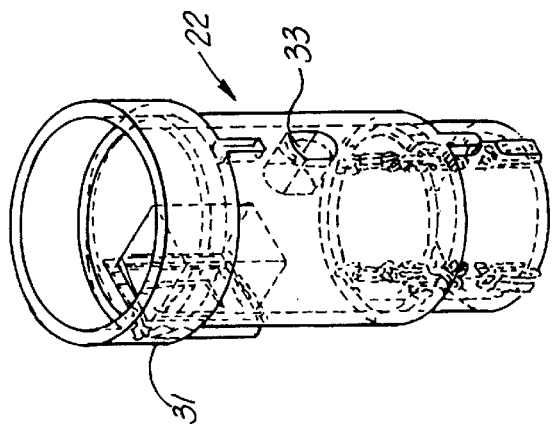
FIGS. 7, 8 and 9 illustrate views of the tube long extension and tube top portions of the lighting assembly of the present invention respectively.
Figure 8:
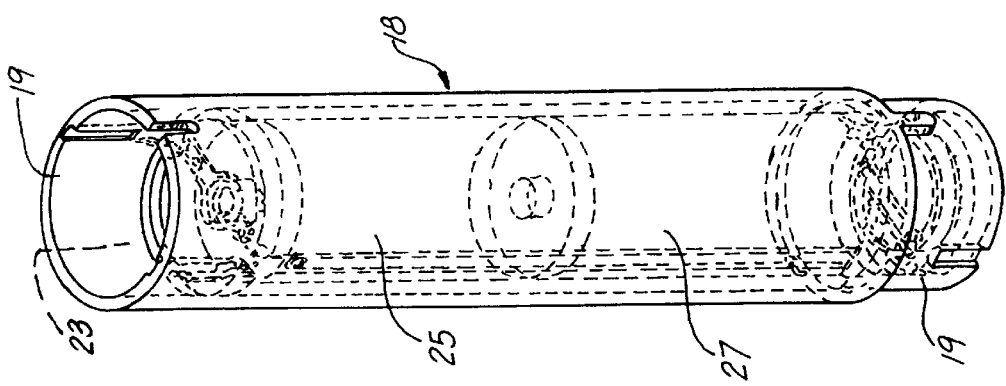
Figure 7:
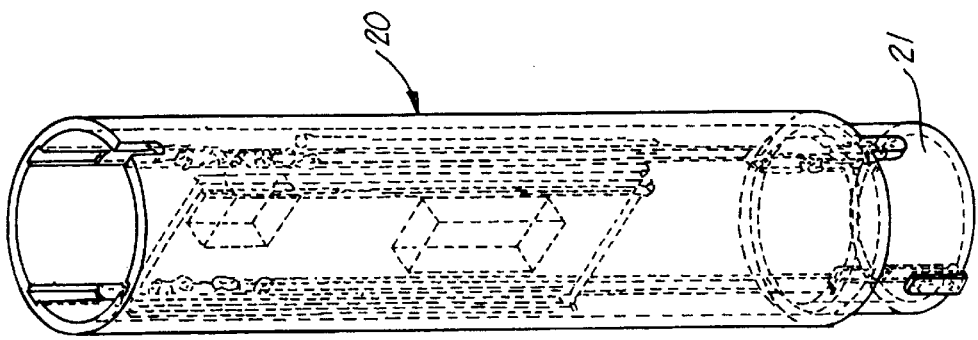

FIGS. 7 through 9 illustrate the upper and lower tube long extension members 18 and 20 and the tube top member 22 as was discussed earlier in the Figures. As seen in these Figures and the overall view of the apparatus as seen in FIG. 1A, it should be noted that the lower most tube member 18, includes a lower base portion 19 for engaging into an upper ring 13 of the circular base member 12. Further, the extension member 18 includes a continuous bore 23 into which a pair of C-type rechargeable batteries 25, 27 are inserted therein and are supported by a lower spring member 29 as seen in the cross sectional view of the overall apparatus 10, in FIG. 1A. When the lower end 21 of upper extension member 20 is engaged onto the upper end 19 of the lower extension member 18, and the upper member 22 is engaged into upper extension member 20, the upper extension member 20 includes means for transmitting the power of the batteries from the lower extension member through the upper extension member 20 to engage the three-way switch 31 that is positioned within the tube top member 22 as seen in FIG. 9. Therefore, in the overall embodiment as seen in FIG. 1A, when the proper switch 31 is engaged, power is received from the batteries 25, 27 in the lower portion of the base for supplying power to the high efficiency fluorescent tube light 42 supported by the tube top member 22.

FIGS. 10 and 11 simply illustrate, again, the overall views of the third extension member 38 which may be used in conjunction with the two extension members 18 and 20 as seen in FIGS. 7 and 8, if one wishes to extend the height of the lamp assembly 10. FIG. 9 as was discussed earlier, illustrates the single extension member 40 which would be utilized in place or in conjunction with the other tube members 18, 20, again, depending on the components of the lighting system. As stated earlier, reference is made to FIG. 5 where the single extension member 40 is illustrated with the composite lamp assembly 10.

FIG. 12 is an overall view of the tube ground stake 50 as was discussed earlier. Again, there is illustrated the upper circular receiver portion 52 for receiving the lower base member 18 in the tube ground stake 50, and the lower end 54 of the tube ground stake 50 which is inserted into the ground. It should be noted as seen in FIG. 5, tube ground stake 50 would be inserted into the ground and the four wings 55, would likewise be pushed into the ground 56 so as to completely stabilize the lamp assembly 10A when it is used in an exterior setting. Again this is more clearly seen in FIG. 5 where the upper surfaces 57 of each of the wings 55 are flush with the ground 56 during use.

FIG. 13 again illustrates the circular base member 12 of the interior embodiment of the present invention, again, showing the circular upper ring portion 16 which supports the lower tube extension member 18 as was described earlier. There is also seen the portal 60 for receiving a power cord or the like into the base for energizing the lamp should one wish to use AC power from an electrical outlet or the like rather than battery or solar power.

Reference is now made to FIG. 14 where there is illustrated in isolated view, an example of the circular vented pedestal 24, having a plurality of vents 25 forming a circular pattern around the base, as illustrated in FIG. 14. There is further illustrated in FIG. 14 intermediate power cone 34 which would include a plurality of solar panels 70 interconnected by a wiring member 72, so that as the cone member 34 is placed upon the vented pedestal base 24, the vented pedestal base 24 includes a solar cell 45, which interconnects into the upright high efficiency fluorescent tube light 42. Therefore, as light would be received by the various Solar panels 70, this light energy would be transmitted into electrical energy for energizing the high efficiency fluorescent tube light 42 during use.

As seen in FIG. 15, there is illustrated an example of a graphic panel cone 36, which would be placed upon, so that light emitted from the upright fluorescent tube light 42 would shine through the translucent cone and give a lighting feature to the outer decorative cone 36. It should be noted that the photo cell on/off switch 33 would be likewise positioned on tube top member 22, as seen in FIG. 9. In another embodiment it is foreseen that the entire system, whether indoor or outdoor may work with a remote control, as well as the on/off switch on the base, or the photocell.

In the preferred embodiments discussed above, both in the indoor and outdoor configurations, it is foreseen that the graphic panel cone 36, supported by the interior cone 26, together with the 2-part finial member, i.e. the finial cup 32, and finial base 30, may be provided as accessories to existing indoor/outdoor light systems, as replacement parts. Of course, the mounting of these accessory items may require adapters and other components to enable them to fit on other light systems.

Figure 16:
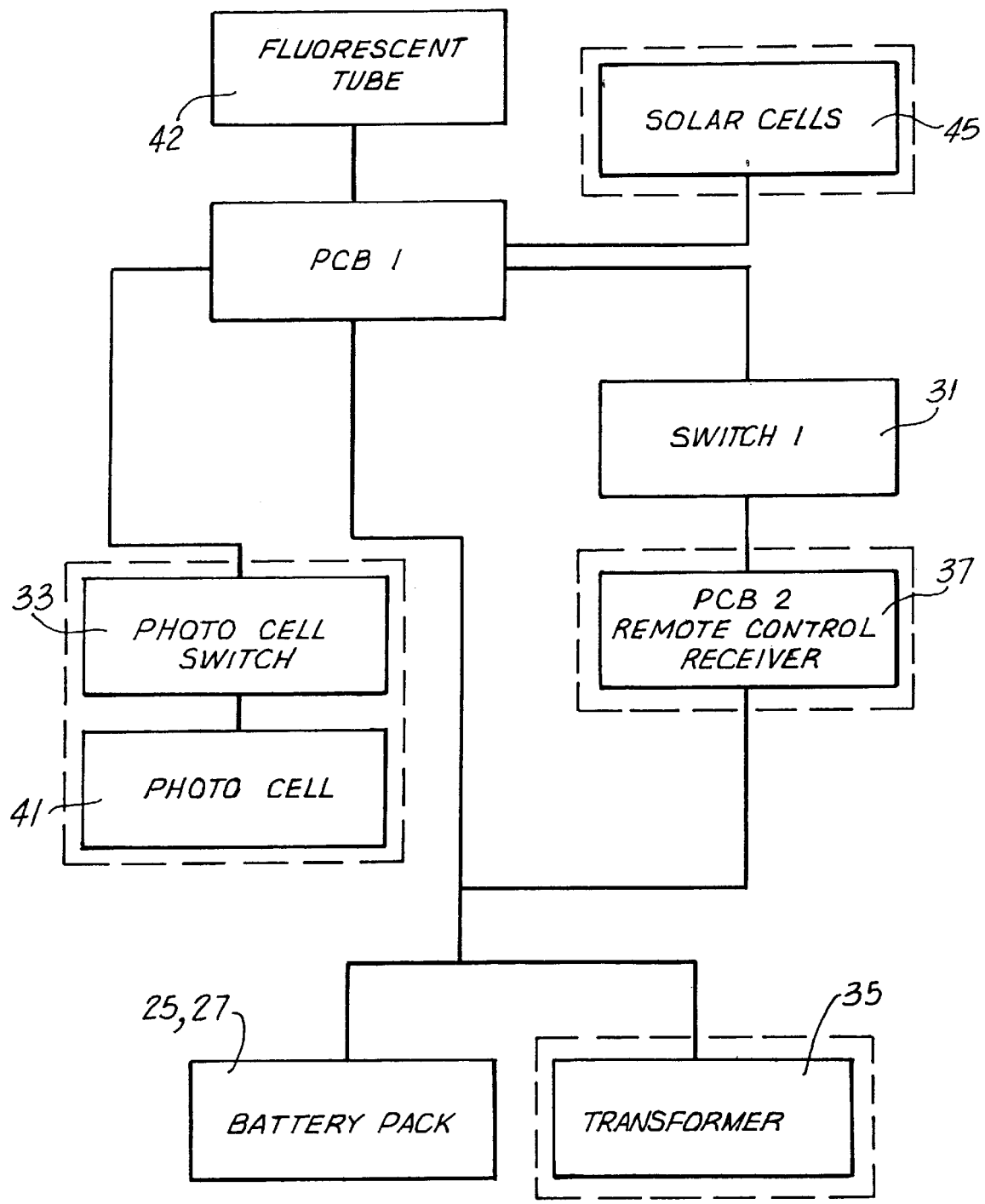
FIG. 16 illustrates a flow chart of the alternate power sources used in the embodiments of the present invention.
Figure 17:
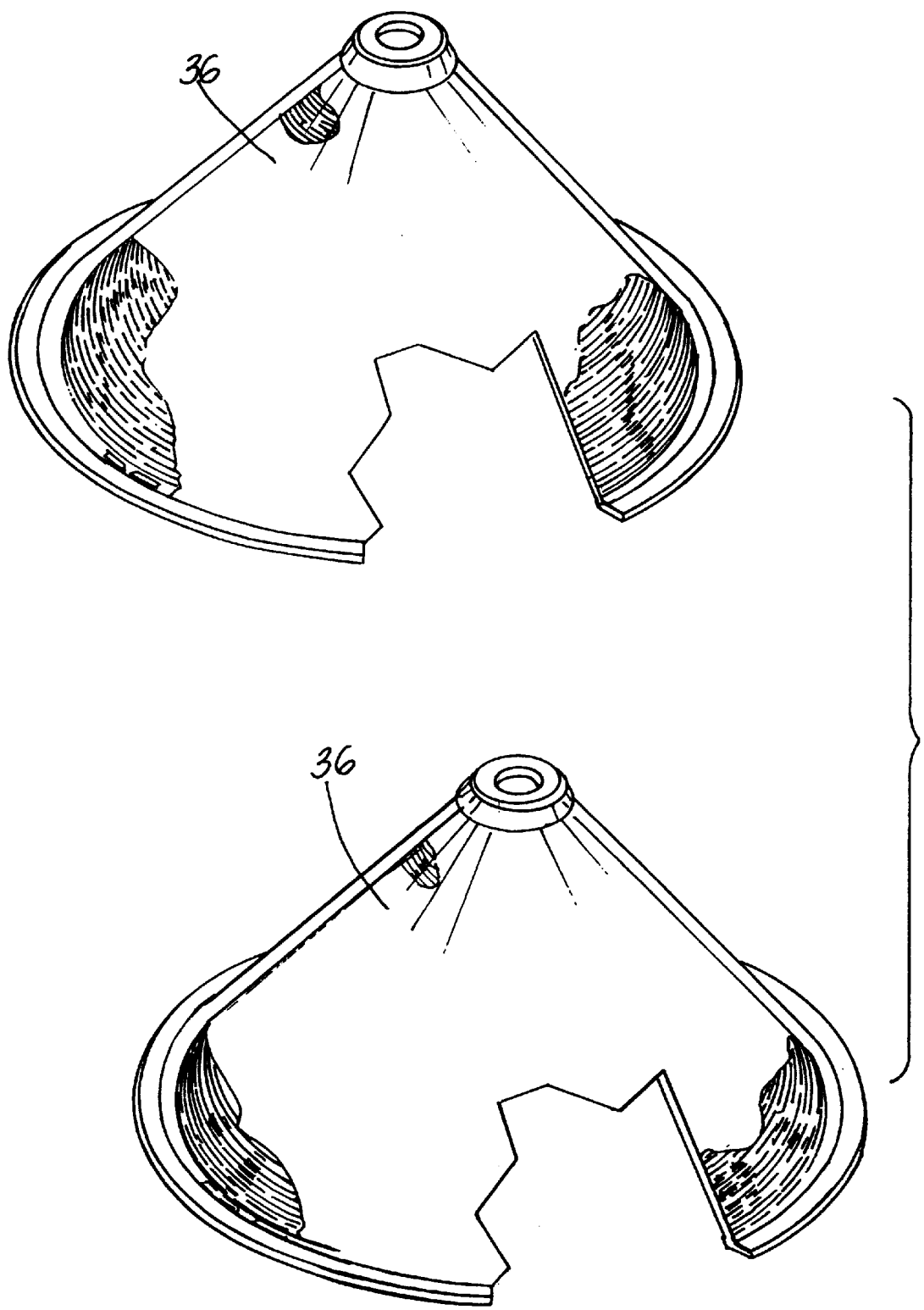
FIG. 17 illustrates the graphic panel.
Figure 18:
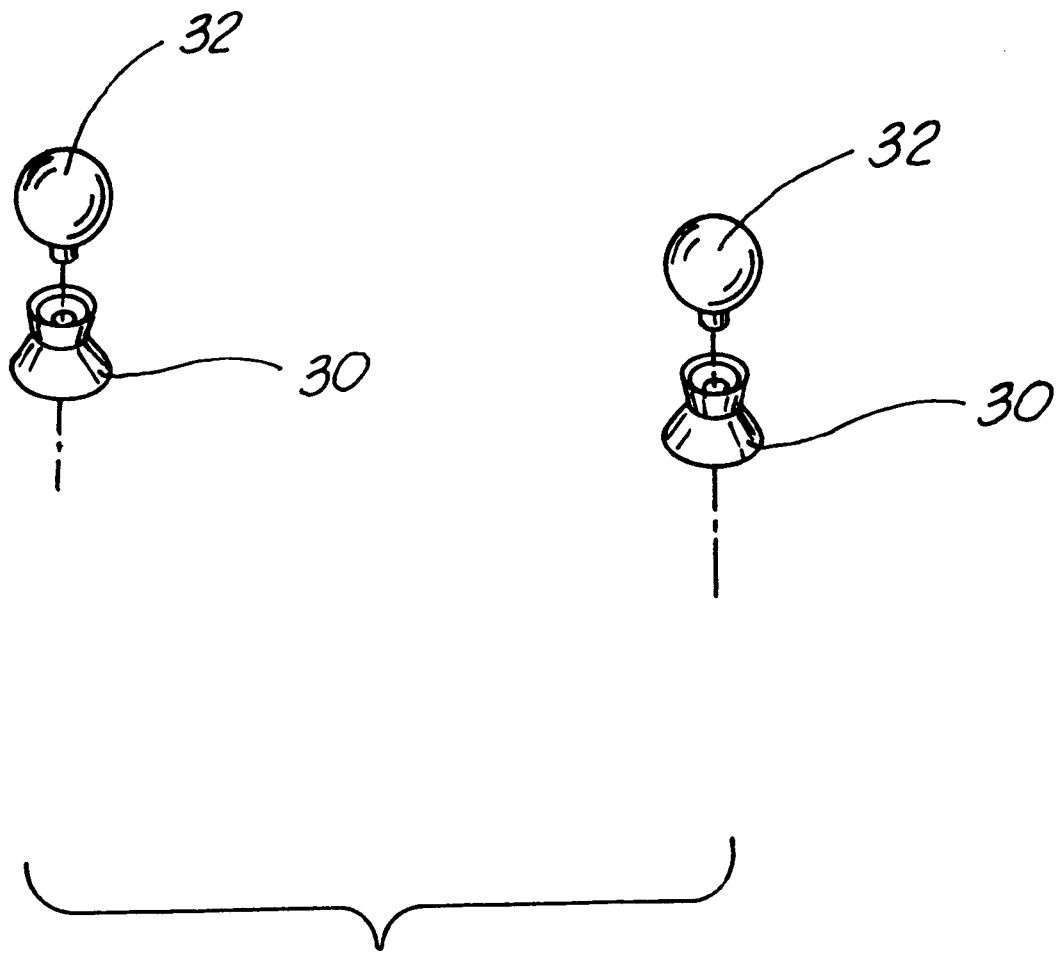
FIG. 18 illustrates finial bases and finial cups.

In FIG. 16, there is depicted the wiring assembly in the various means for providing energy to the lighting system. For example, there is illustrated the battery 25, 27, and a transformer 35, for providing power to a first remote control receiver 37 which would receive a signal from remote controller 59 as seen in FIG. 3 for activating the lighting system remotely. Further, there is illustrated a first switch 31, with the first switch 31 allowing energy to flow into PCB1 and then into the fluorescent tube 42 for energizing the tube. In the embodiment which would utilize photo power, there is illustrated the solar cell 41 operated by switch 33, which would feed into the PCB1. The PCB1 would receive signals from the photocell 41 via photocell switch 33, which would then transform the solar energy from solar cells 45 into PCB1 to electrical energy for energizing the fluorescent tube 42. Of course, as was described earlier, the multiple power sources are critical to the present invention as is the fact that the present invention would allow the interchangeability of the exterior graphic panel cone members 36 and the interchangeable finial base 30 and finial cups 32 whether they be used in indoor or outdoor use, so as to provide multiple designs, depending on the theme one wishes to depict in utilizing the systems either indoor or outdoor.

The foregoing embodiments are presented by way of example only; the scope of the present invention is to be limited only by the following claims.

I Claim:

1. A composite lighting fixture, comprising:
   a. an elongated base member, with a first end positionable on a surface, such as a table;
   b. a support member positioned adjacent a second end of the elongated base member and supporting a light fixture thereon;
   c. at least a substantially translucent base cone positioned on the support member;
   d. an interchangeable decorative cone positionable on the base cone; and
   e. a finial member positionable on a peak of the base cone, the finial member removable therefrom to be interchanged with other finial members; and
   f. power means for supplying electrical power to the light fixture for providing light to and illuminating the decorative cone.

2. A composite lighting fixture, comprising:
   a. an elongated base member which may be pointed for inserting into the ground the lighting fixture as an outdoor fixture;
   b. a support member positioned adjacent a second end of the elongated base member and supporting a light fixture thereon;
   c. at least a substantially translucent base cone positioned on the support member;
   d. an interchangeable decorative cone positionable on the base cone; and
   e. a finial member positionable on a peak of the base cone, the finial member removable therefrom to be interchanged with other finial members; and f. power means for supplying electrical power to the light fixture for providing light to and illuminating the decorative cone.

3. The lighting fixture in claim 1, wherein the elongated base member would further comprise a plurality of submembers of substantially uniform diameter supported in relation to one another to define a light fixture of varying heights.

4. The lighting fixture in claim 1, wherein the base cone would be comprised of substantially transparent material.

5. The lighting fixture in claim 1, wherein the finial member would further comprise an assortment of various designs of members to be interchanged as desired.

6. The lighting fixture in claim 1, wherein the decorative cone provides a plurality of interchangeable cones.

7. An outdoor lighting assembly, comprising:
   a. an elongated base member, comprising a first end insertable into the ground;
   b. at least an elongated tube member secured to the base member;
   c. a support member positioned adjacent an upper end of the tube member and supporting a light fixture thereupon;
   d. a translucent base cone positioned on the support member for allowing light from the light fixture to shine therethrough;
   e. a decorative cone positionable on the base cone for being illuminated by the light fixture; and
   g. a plurality of interchangeable finial members, at least one finial member positionable on a peak of the base cone, the finial member removable therefrom to be interchanged with a second of the plurality of finial members as desired; and
   h. means for supplying electrical energy to the light fixture, said means further comprising batteries within the light assembly.

8. The lighting fixture in claim 7, wherein the first end of the elongated base member may be pointed for inserting into the ground to support the lighting fixture as an outdoor fixture.

9. The lighting fixture in claim 7, wherein the elongated base member would further comprise a plurality of submembers supported in relation to one another to define a light fixture of varying heights.

10. The lighting fixture in claim 7, wherein the base cone would be comprised of translucent material.

11. The lighting fixture in claim 7, wherein the finial member would further comprise an assortment of various designs of members to be interchanged as desired.

12. The lighting fixture in claim 7, wherein the decorative cone provides a plurality of interchangeable cones.

13. A composite lighting assembly, comprising:
   a. a base member, for supporting the lighting assembly upright;
   b. at least one elongated tube member secured to the base member;
   b. a support member positioned adjacent an upper end of the tube member and supporting a light fixture thereupon;
   c. a translucent base cone positioned on the support member for allowing light from the light fixture to shine therethrough;
   d. a decorative cone positionable on the base cone for being illuminated by the light fixture; and
   e. means for supplying electrical energy to the light fixture, said means further comprising solar cells positioned in the base cone.

14. The lighting assembly in claim 13, further comprising: a plurality of interchangeable finial members, at least one finial member positionable on a peak of the base cone, the finial member removable therefrom to be interchanged with a second of the plurality of finial members as desired.

15. The lighting assembly in claim 14, further comprising additional upright members for providing additional height to the lighting assembly.

16. The lighting assembly in claim 13, further comprising batteries in the lighting assembly for providing electrical power to the lighting fixture.

17. The lighting assembly in claim 13, wherein the electrical power may be provided by standard AC electrical power.

18. The lighting assembly in claim 13, further comprising a plurality of decorative cones which are interchangeable on the base cone of the lighting assembly.

19. A composite lighting assembly, of the type having a base member, for supporting the lighting assembly upright; at least one elongated tube member secured to the base member; a support member positioned adjacent an upper end of the tube member and supporting a light fixture thereupon; means for supplying electrical energy to the light fixture; the improvement comprising:
   a. a translucent base cone positioned on the support member for allowing light from the light fixture to shine therethrough;
   b. a decorative cone positionable on the base cone for being illuminated by the light fixture; and
   c. a plurality of interchangeable finial members, at least one finial member positionable on a peak of the base cone, the finial member removable therefrom to be interchanged with a second of the plurality of finial members as desired.

20. The composite lighting assembly in claim 19 further comprising a remote control apparatus for activating the lighting system from a remote location by a user.

* * * * *